(12) United States Patent
Kobori

(10) Patent No.: US 7,270,103 B2
(45) Date of Patent: Sep. 18, 2007

(54) INTAKE APPARATUS OF INTERNAL COMBUSTION ENGINE

(75) Inventor: Yoichi Kobori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 155 days.

(21) Appl. No.: 11/350,010

(22) Filed: Feb. 9, 2006

(65) Prior Publication Data

US 2006/0191504 A1 Aug. 31, 2006

(30) Foreign Application Priority Data

Feb. 28, 2005 (JP) ............... 2005-054628

(51) Int. Cl.
*F02M 35/10* (2006.01)

(52) U.S. Cl. .................. 123/184.53; 123/184.55

(58) Field of Classification Search .......... 123/184.21, 123/184.51, 184.53, 184.55
See application file for complete search history.

(56) References Cited

U.S. PATENT DOCUMENTS

| | | | | |
|---|---|---|---|---|
| 2,835,235 A | * | 5/1958 | Gassmann | 123/184.55 |
| 4,619,226 A | * | 10/1986 | Ueda et al. | 123/184.55 |
| 4,646,689 A | * | 3/1987 | Katsumoto et al. | 123/184.55 |
| 4,759,320 A | * | 7/1988 | Fujii et al. | 123/184.55 |
| 4,862,840 A | * | 9/1989 | Matsunaga et al. | 123/184.55 |
| 4,977,866 A | * | 12/1990 | Wilkins | 123/184.34 |
| 5,494,319 A | * | 2/1996 | Thomas | 285/55 |
| 5,740,770 A | * | 4/1998 | Morota | 123/184.55 |
| 5,796,022 A | * | 8/1998 | Miller | 84/380 R |
| 5,823,157 A | * | 10/1998 | Muramatsu | 123/184.56 |
| 5,950,587 A | * | 9/1999 | Sattler et al. | 123/184.55 |
| 6,901,898 B1 | * | 6/2005 | Oberg et al. | 123/184.55 |
| 6,966,292 B2 | * | 11/2005 | Huang | 123/184.21 |
| 6,983,727 B2 | * | 1/2006 | Narayanaswamy | 123/184.55 |
| 6,986,333 B2 | * | 1/2006 | Boyes | 123/184.21 |

FOREIGN PATENT DOCUMENTS

| | | |
|---|---|---|
| DE | 3807193 | 6/1989 |
| EP | 0237755 | 9/1987 |
| FR | 2682431 | 4/1993 |
| JP | 60228723 | 11/1985 |
| JP | 11022472 | 1/1999 |
| JP | 2001-082155 | 3/2001 |
| JP | 2001-509562 | 7/2001 |

OTHER PUBLICATIONS

International Search Report for Appln. No. PCT/JP2006/302431 issued Jul. 4, 2006.
Written Opinion of the International Searching Authority issued Jul. 4, 2006.

* cited by examiner

*Primary Examiner*—Stephen K. Cronin
*Assistant Examiner*—Hyder Ali
(74) *Attorney, Agent, or Firm*—Kenyon & Kenyon LLP

(57) ABSTRACT

A variable intake passage is made of a tubular space that is formed with a fixed member and a movable member arranged to face the fixed member and having a relative position with the fixed member changed. The movable member is moved to increase or decrease a distance of an air introducing portion from the combustion chamber to thereby change a passage length. The variable intake passage has a cross section that gradually increases from an upstream side to a downstream side in the air introducing direction. When the passage length of the variable intake passage is changed, the cross section of the air introducing portion of the variable intake passage is changed correspondingly.

2 Claims, 13 Drawing Sheets

INTAKE APPARATUS OF INTERNAL COMBUSTION ENGINE

This nonprovisional application is based on Japanese Patent Application No. 2005-054628 filed with the Japan Patent Office on Feb. 28, 2005, the entire contents of which are hereby incorporated by reference.

BACKGROUND OF THE INVENTION

1. Field of the Invention

The present invention relates to an intake apparatus incorporated in an internal combustion engine such as an engine installed in a vehicle or the like.

2. Description of the Background Art

An internal combustion engine such as an engine installed in a vehicle or the like is generally provided with an intake apparatus for supplying an air-fuel mixture to a combustion chamber. The intake apparatus has an intake passage that constitutes a communicating section between a surge tank and an intake port of a cylinder head. The intake passage is provided for each intake port (cylinder).

There are conventionally two types of intake apparatuses: one having a passage fixed to a prescribed length, and the other having a passage changeable in length (see Japanese Patent National Publication No. 2001-509562, and Japanese Patent Laying-Open No. 2001-082155).

During an intake stroke of the internal combustion engine, when an intake valve is opened to introduce an air-fuel mixture, the air within the intake passage is normally supplied into the combustion chamber with pulsation. With such pulsation of the air within the intake passage, the air flow contains a portion of high density and a portion of low density that appear alternately. The period of the pulsation of the air is determined according to selection of shape, length, cross section and the like of the intake passage. Meanwhile, the timing of opening/closing the intake valve is determined according to the engine speed.

If it is possible to arrange the high-density portion of the air at the latter part of the intake stroke, the intake air will continue to flow into the combustion chamber by virtue of inertia even after the piston moves past the bottom dead center, which is called the "inertial supercharging effect". This improves intake volumetric efficiency of the combustion chamber, and hence, the output of the internal combustion engine.

In the intake apparatus of the variable-length type, the passage length can be changed in accordance with the operation states of the internal combustion engine such as the load, engine speed and the like, so as to ensure the above-described inertial supercharging effect over the entire operation region of the internal combustion engine. This can improve the intake volumetric efficiency of the combustion chamber.

The conventional techniques however have the following problems. Firstly, in the conventional example shown in Japanese Patent National Publication No. 2001-509562, although the passage has a variable length, its cross section is uniform from the upstream side to the downstream side in the air introducing direction. Thus, it would be difficult to improve the intake volumetric efficiency over the entire region from the low engine speed region to the high engine speed region of the internal combustion engine.

Specifically, if the cross section of the intake passage is set small in accordance with the amount of the air required at the low engine speed region of the internal combustion engine, it will be difficult to secure the amount of the air required at the high engine speed region of the internal combustion engine. On the contrary, if the cross section of the intake passage is set large in accordance with the air amount required at the high engine speed region of the internal combustion engine, it will be necessary to practically secure a maximum passage length to be adapted to the low engine speed region of the internal combustion engine. This would inevitably increase the size of the component(s) constituting the intake passage, which cannot be installed in a vehicle unless the corresponding space can be secured therein.

In the conventional example shown in Japanese Patent Laying-Open No. 2001-082155, as shown in FIGS. 1-3 thereof, the stationary pipe 9 and the in-out pipe 8 are different in inner diameter size from each other. This causes an unlevel portion in inner diameter at the inner end of in-out pipe 8, possibly degrading intake efficiency.

SUMMARY OF THE INVENTION

An object of the present invention is to provide an intake apparatus of an internal combustion engine that is compact in size and can guarantee proper intake performance in accordance with an operation state of the internal combustion engine.

An intake apparatus of an internal combustion engine according to the present invention is for supplying an air to a combustion chamber of the internal combustion engine, and includes a variable intake passage having a passage length from an air introducing portion to the combustion chamber configured to be changeable. The variable intake passage is made of a tubular space that is formed with a fixed member and a movable member arranged to face the fixed member and having a relative position with the fixed member changed. The movable member is moved to make a position of the air introducing portion farther from or closer to the combustion chamber to increase or decrease the passage length. The variable intake passage has a cross section that gradually increases from an upstream side to a downstream side in an air introducing direction.

The variable intake passage may be of any shape including a linear shape, a curved shape, a looped shaped and others.

According to this configuration, when the movable member is moved such that the air introducing portion becomes closer to the combustion chamber, the passage length gradually decreases and at the same time the cross section of the air introducing portion gradually increases. When the movable member is moved such that the air introducing portion becomes farther from the combustion chamber, the passage length gradually increases and the cross section of the air introducing portion gradually decreases. The former state is suitable for use in the high engine speed region, while the latter state is suitable for use in the low engine speed region.

As described above, the length and the cross section of the passage can be changed as appropriate in accordance with the operation state (e.g., engine speed) of the internal combustion engine. This ensures proper intake performance in accordance with the operation state. Further, the unlevel or stepped portion as in the conventional example is not created at the inner surface of the variable intake passage. Thus, smooth air flow is ensured, which contributes to improvement of intake efficiency.

In the intake apparatus described above, the fixed member may be an outer tube and the movable member may be an inner tube that is supported by the outer tube constituting the fixed member in a coaxial and relatively rotatable manner.

The inner tube constituting the movable member may be rotated in a normal or opposite direction about its central axis to continuously change the passage length of the variable intake passage.

This configuration specifies the variable intake passage of a looped shape, which enables downsizing of the outer shape and reduction of its occupying space.

In the intake apparatus described above, the outer tube constituting the fixed member may have an inner peripheral groove, and the inner tube constituting the movable member may have a lid shape blocking an opening of the inner peripheral groove of the fixed member. The inner peripheral groove of the fixed member may have a groove depth that gradually increases from the upstream side to the downstream side in the air introducing direction of the variable intake passage.

With this configuration, the depth of the inner peripheral groove at the outer tube is changed such that the variable intake passage has the cross section that gradually increases from the upstream side to the downstream side in the air introducing direction. It is specified that the inner tube has a simple lid shape, which facilitates production of the inner tube.

In the intake apparatus described above, the outer tube constituting the fixed member may have an inner peripheral groove, and the inner tube constituting the movable member may have an outer peripheral groove that faces the inner peripheral groove of the fixed member to form a tubular space. At least one of the inner peripheral groove of the fixed member and the outer peripheral groove of the movable member may have a groove depth that gradually increases from the upstream side to the downstream side in the air introducing direction of the variable intake passage.

With this configuration, the depth of the inner peripheral groove of the outer tube or the outer peripheral groove of the inner tube is changed such that the variable intake passage has the cross section that gradually increases from the upstream side to the downstream side in the air introducing direction, which facilitates production of the outer tube or the inner tube. Further, no stepped portion is created on the inner surface of the variable intake passage along the longitudinal direction.

The intake apparatus described above may further include a driving mechanism for driving and rotating the inner tube constituting the movable member. The driving mechanism may be controlled to rotate the movable member in a direction increasing a distance of the air introducing portion from the combustion chamber to thereby increase the passage length and decrease the cross section of the air introducing portion when the internal combustion engine is in a low engine speed region. The driving mechanism may be controlled to rotate the movable member in a direction decreasing the distance of the air introducing portion from the combustion chamber to thereby decrease the passage length and increase the cross section of the air introducing portion as the internal combustion engine approaches a high engine speed region.

With this configuration, the driving mechanism for driving the inner tube to change the passage length of the variable intake passage is provided, which facilitates the change of the passage length. The use of this driving mechanism is advantageous, e.g., for automation of the process of detecting an operation state of the internal combustion engine and properly adjusting the passage length as well as the cross section of the air introducing portion in accordance with the detected state.

According to the present invention, it is possible to provide an intake apparatus that is compact in size and that can guarantee proper intake performance in accordance with an operation state over the entire region from the low engine speed region to the high engine speed region of the internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Hereinafter, a first embodiment of the present invention will be described with reference to FIGS. 1-5. In the present embodiment, a 4-cylinder gasoline engine installed in a vehicle is shown as an example of the internal combustion engine. The number of cylinders, however, is not particularly restricted, and it may be a diesel engine.

Figure 1:
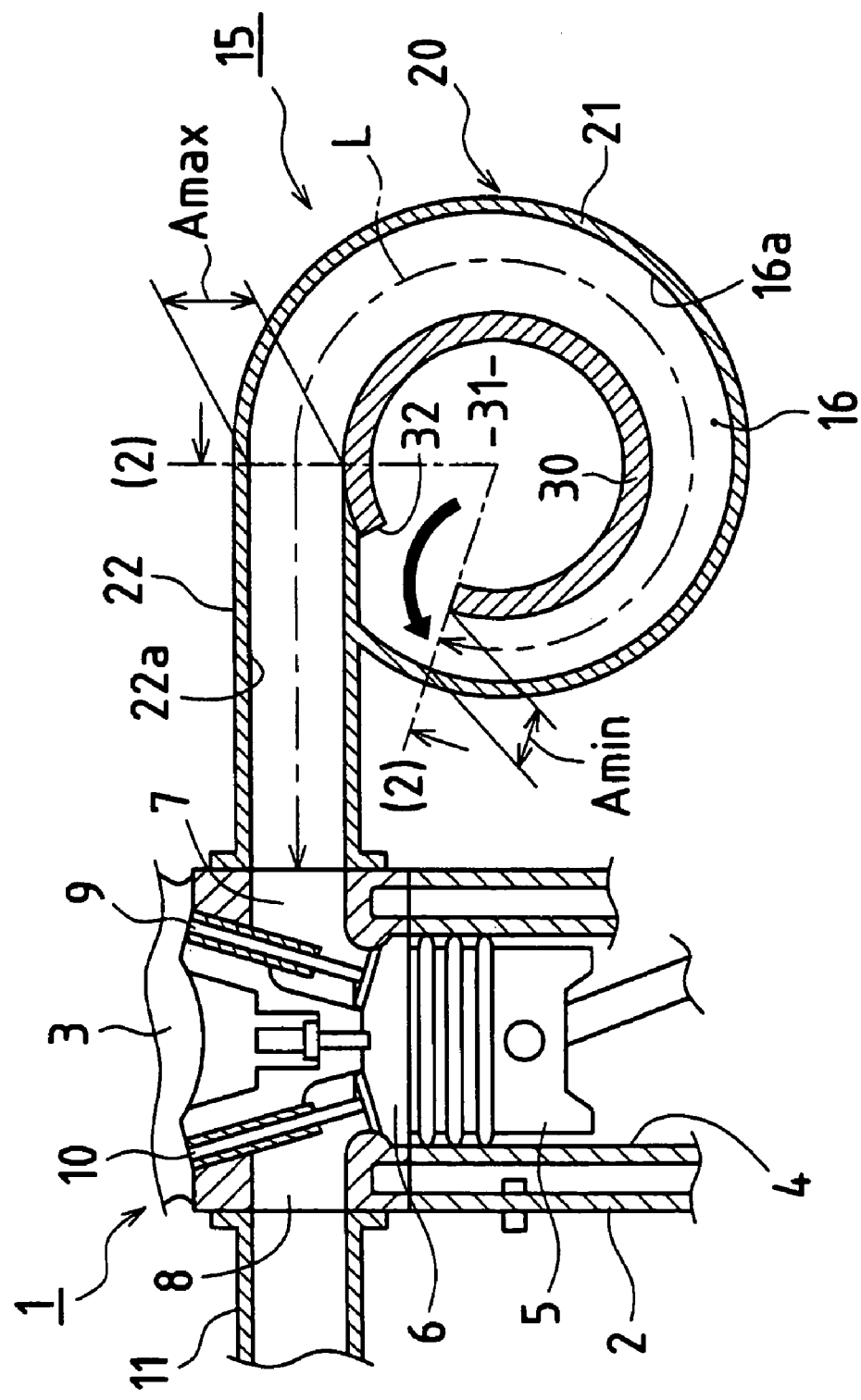
FIG. 1 is a cross sectional view of an internal combustion engine provided with an intake apparatus according to a first embodiment of the present invention.

As shown in FIG. 1, the engine 1 has a cylinder block 2 and a cylinder head 3.

Cylinder block 2 is provided with a plurality of (in this case, four) cylinders 4. Each cylinder 4 has a piston 5 inserted therein, which performs a reciprocating motion. In each cylinder 4, the space partitioned by the upper end of piston 5 and cylinder head 3 constitutes a combustion chamber 6.

Cylinder head 3 has an intake port 7 and an exhaust port 8 provided corresponding to combustion chamber 6. Intake port 7 and exhaust port 8 have inner-side openings (on the side of combustion chamber 6) opened/closed by an intake valve 9 and an exhaust valve 10, respectively.

Intake port 7 has its outer-side opening connected to an intake apparatus 15. Although not shown in the figure, intake apparatus 15 is connected via an intake pipe to a throttle body, which is opened/closed based on the manipulation of the accelerator pedal, and to an air cleaner. Exhaust port 8 is connected to an exhaust manifold 11.

Hereinafter, the configuration of intake apparatus 15 will be described in detail.

As shown in FIGS. 1-4, intake apparatus 15 has a prescribed number of variable intake passages 16 having a passage length L that can be changed continuously. The number of variable intake passages 16 corresponds to the number (in this case, four) of intake ports 7.

Variable intake passage 16 is formed of a combination of an outer tube 20 constituting a fixed member that is fixedly secured to cylinder head 3, and an inner tube 30 constituting a movable member that is supported by outer tube 20 in a relatively rotatable manner.

Figure 4:
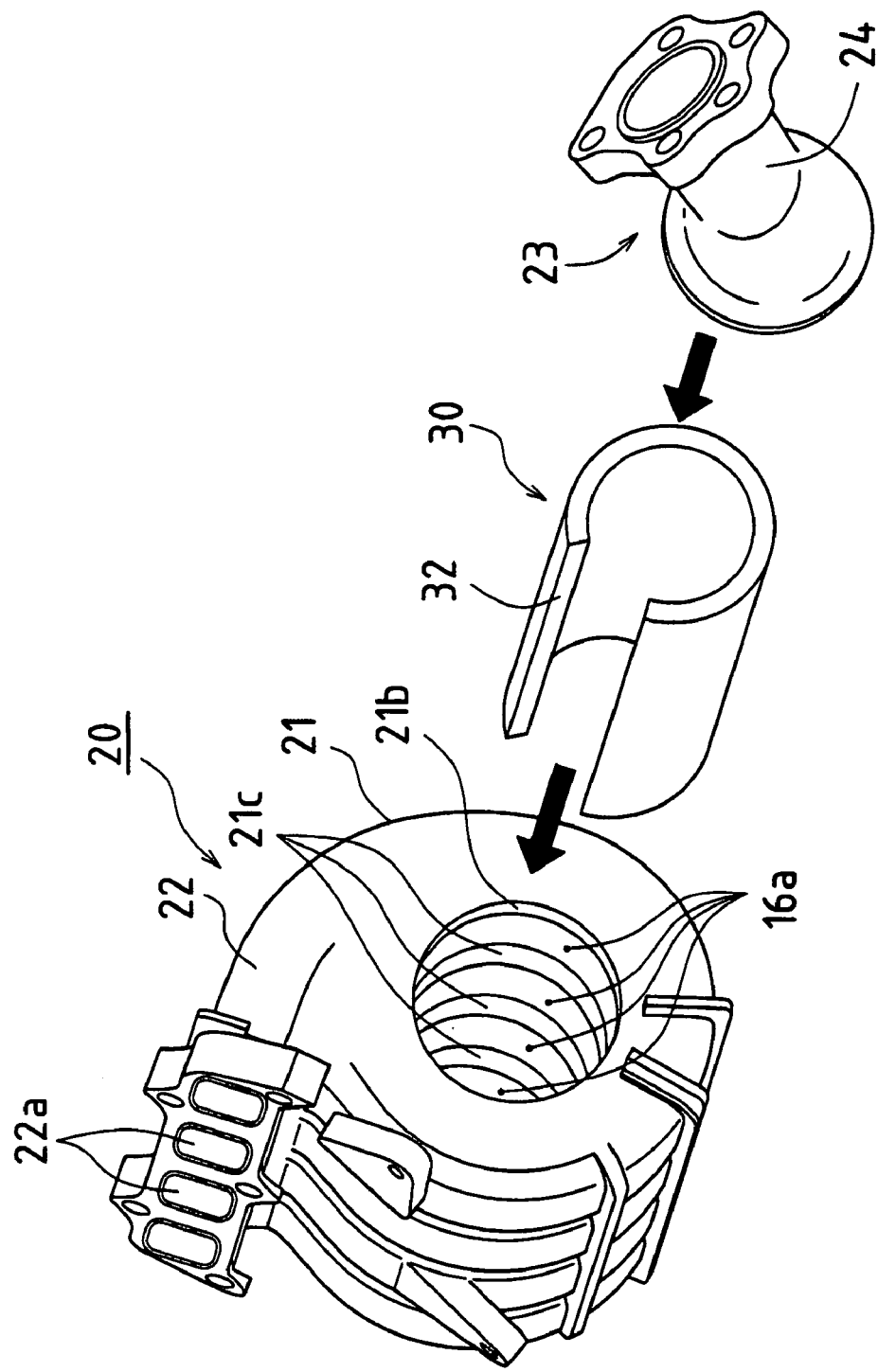
FIG. 4 is an exploded perspective view schematically showing an inside of the intake apparatus of FIG. 1.

Outer tube 20, as shown in FIG. 4, has an outer tube main body portion 21 of a bottomed cylindrical shape, and a linearly projecting portion 22 that linearly extends from a prescribed position on the circumference of outer tube main body portion 21 in a tangential direction for a prescribed length. An opening of outer tube main body portion 21 opposite to a bottom wall portion 21*a* thereof is blocked when a lid 23 having an air introducing pipe 24 is attached thereto. Air introducing pipe 24 is connected to the throttle body (not shown) and the air cleaner (not shown) via the intake pipe (not shown) as described above.

Figure 2:
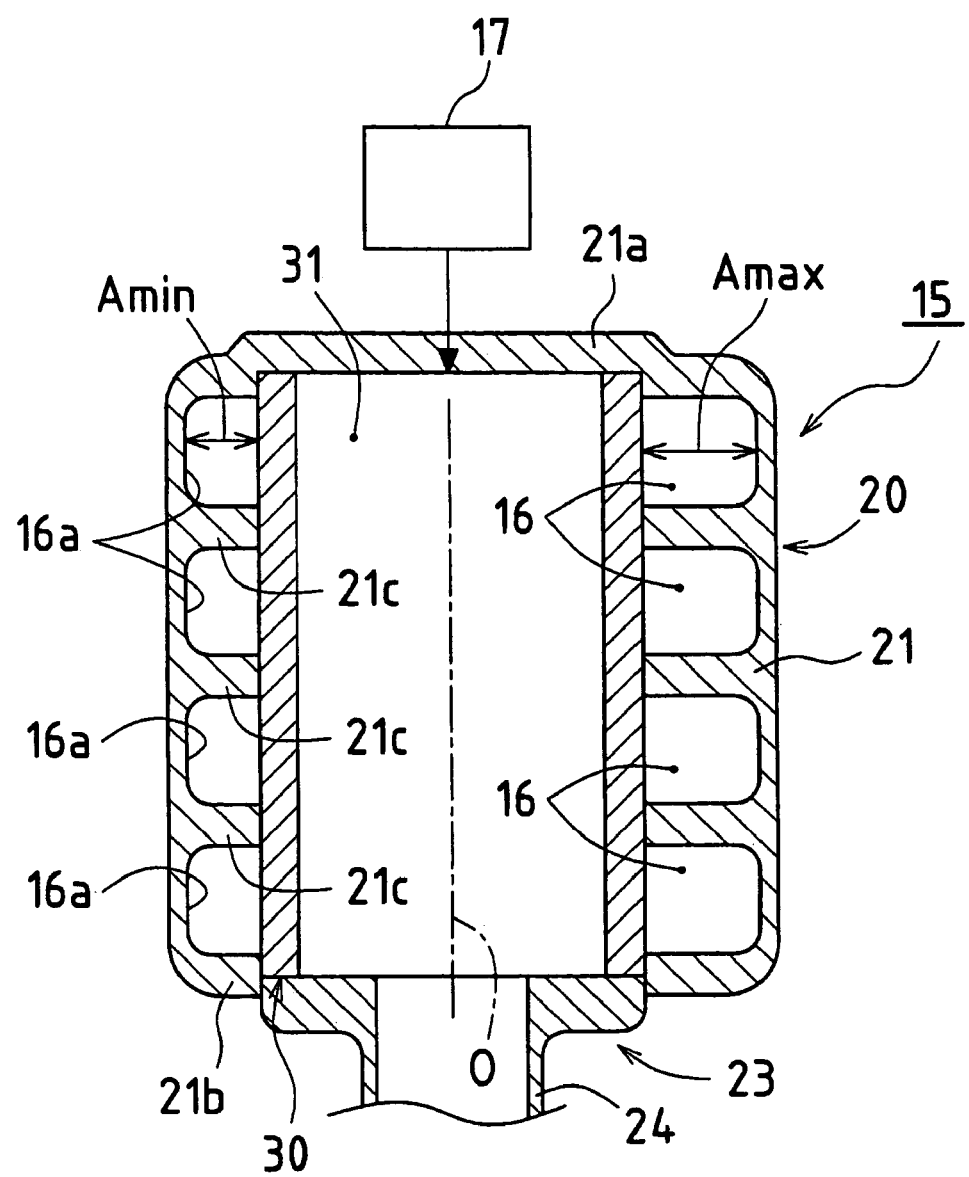
FIG. 2 shows a cross section along the line (2)-(2) in FIG. 1 as seen in the direction indicated by the arrow.
Figure 3:
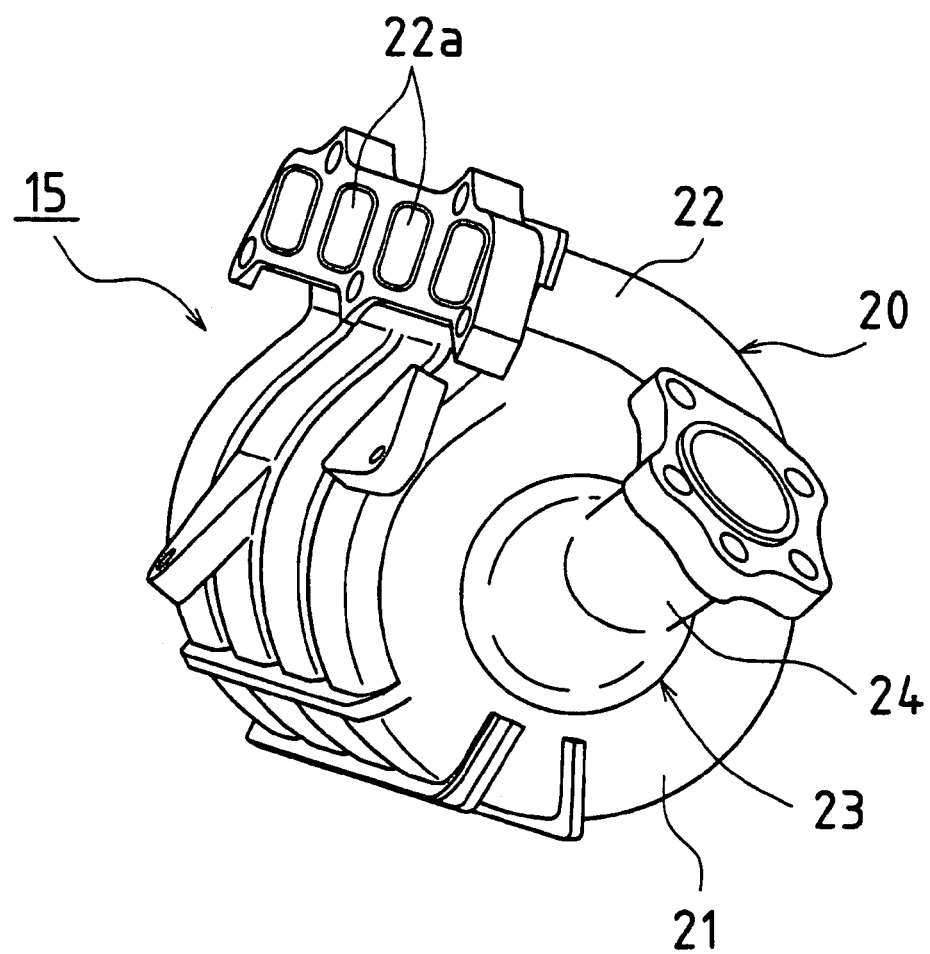
FIG. 3 is a perspective view of the intake apparatus of FIG. 1.

On the opening side of outer tube main body portion 21, an outer collar portion 21*b* is provided to extend inward in the radial direction, as shown in FIGS. 2 and 4. On the inner surface of the outer peripheral wall of outer tube main body portion 21, three partition walls 21*c* extending radially inward are provided at regular intervals in the region between outer collar portion 21*b* and bottom wall portion 21*a*. Bottom wall portion 21*a*, outer collar portion 21*b* and three partition walls 21*c* together form four inner peripheral grooves 16*a*.

Linearly projecting portion 22 has four through holes 22*a* therein arranged side by side in parallel with each other. Through holes 22*a* penetrate through the projecting portion 22 to extend from the projecting end to outer tube main body portion 21. The projecting end of linearly projecting portion 22 is fixedly attached to cylinder head 3, so that through holes 22*a* are individually connected in a communicating manner to corresponding intake ports 7 at cylinder head 3. Through hole 22*a* has a uniform cross section over its entire length.

In practice, inner tube 30 is cut out and disconnected at a prescribed region on the circumference thereof, as shown in FIG. 4, and thus has a C-shape as seen from the side face. Inner tube 30 is fitted in the inner peripheral portion of outer tube 20 and supported in a rotatable manner. An internal space of inner tube 30 thus fitted in outer tube 20 constitutes a surge tank 31. Inner tube 30 has a disconnected portion 32 as described above.

The opening side of inner peripheral groove 16*a* of outer tube 20 is blocked by inner tube 30 to obtain a tubular space, which constitutes the variable intake passage 16. Variable intake passage 16 may have a cross section of any of semicircle, circle, rectangle, ellipse and the like.

Variable intake passage 16 is connected in a communicating manner to through hole 22*a* of linearly projecting portion 22. Disconnected portion 32 of inner tube 30 serves as an air introducing portion through which the air in surge tank 31 inside inner tube 30 is introduced into variable intake passage 16.

Variable intake passage 16 has a passage length L that can be decreased or increased by turning inner tube 30 to change the position of the air introducing portion (disconnected portion 32) closer to or farther from combustion chamber 6.

Further, variable intake passage 16 has its cross section gradually increasing from the upstream side to the downstream side in the air introducing direction. In the present embodiment, the cross section of variable intake passage 16 is greatest at the portion where it is connected to through hole 22*a* of linearly projecting portion 22, and smallest at the position of disconnected portion 32 of inner tube 30 in the state where passage length L of variable intake passage 16 is made longest.

To this end, in variable intake passage 16, inner peripheral groove 16*a* of outer tube 20 is made to have a greatest depth (see "Amax" in FIGS. 1 and 2) at the connected portion with through hole 22*a* of linearly projecting portion 22. In the state where passage length L of variable intake passage 16 is made longest, inner peripheral groove 16*a* of outer tube 20 is made to have a smallest depth (see "Amin" in FIGS. 1 and 2) at the position of disconnected portion 32 of inner tube 30.

Inner tube 30 is configured such that it is driven to rotate in a given direction by an actuator 17, which is formed of an electric motor such as a servo-motor, a stepping motor, or the like.

For example, when actuator 17 is used to rotate inner tube 30 in a normal or opposite direction about its central axis O, the position of disconnected portion 32 of inner tube 30 is displaced in the circumferential direction around central axis O of inner tube 30, so that passage length L of variable intake passage 16 is changed continuously. The cross section of the air introducing portion (disconnected portion 32) is also changed along with the continuous change in passage length L of variable intake passage 16.

Figure 5:
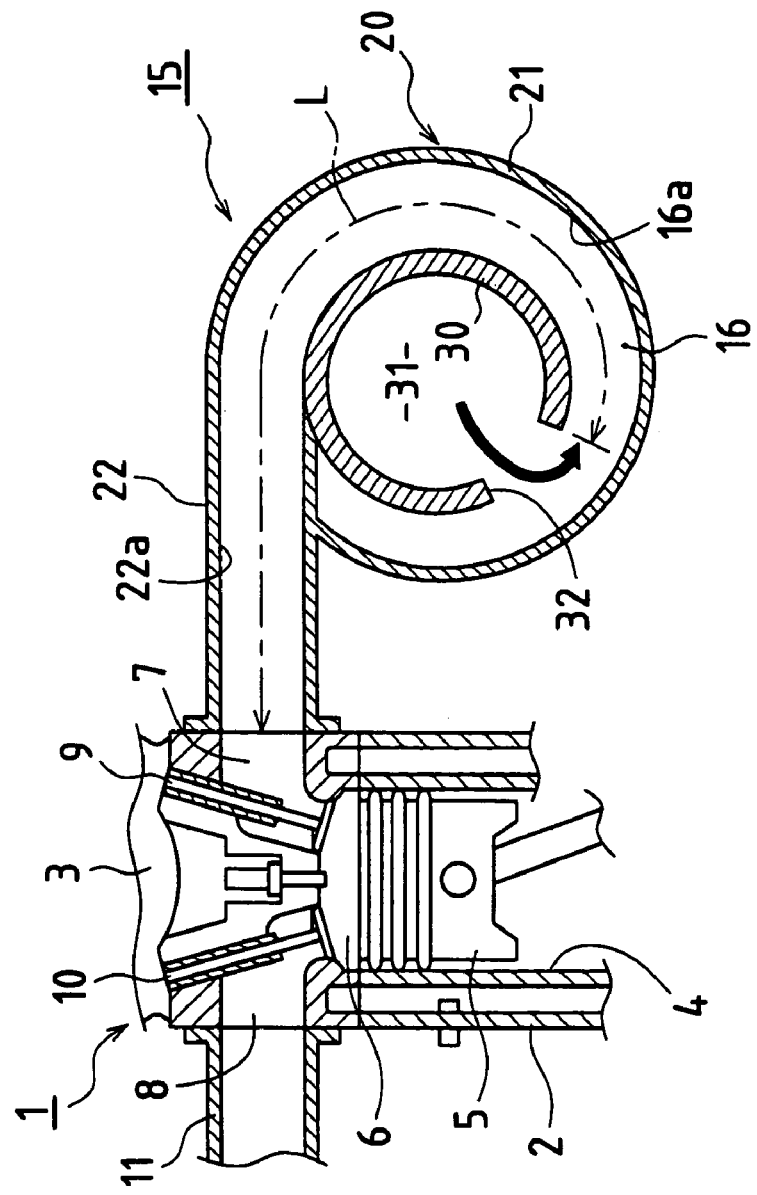
FIG. 5 is a cross sectional view showing the variable intake passage of FIG. 1 in the state where its passage length is shortened.

Specifically, in the region of low engine speed of engine 1, inner tube 30 may be arranged as shown in FIG. 1, for example, so that passage length L of variable intake passage 16 increases while the cross section of the air introducing portion (disconnected portion 32) decreases. In the high engine speed region, inner tube 30 may be arranged as shown in FIG. 5, for example, so that passage length L of variable intake passage 16 decreases while the cross section of the air introducing portion (disconnected portion 32) increases. In the intermediate engine speed region, inner tube 30 may be arranged as appropriate between the positions shown in FIGS. 1 and 5. As such, it is possible to secure an appropriate amount of the air in response to the increase/decrease of the engine speed of engine 1.

In any case, the external air is introduced into surge tank 31 of intake apparatus 15 through the air cleaner and the intake pipe which are not shown. The air passes inside variable intake passage 16 while experiencing pulsation, and is introduced via intake port 7 of cylinder head 3 into combustion chamber 6.

The maximum passage length, the minimum passage length, the maximum cross section, and the minimum cross section of variable intake passage 16 are preferably set to dimensions having empirically been obtained through appropriate experiments. With such settings, the air of a proper amount can be secured in any engine speed region of engine 1.

The above-described operations can be managed using an engine ECU (Electronic Control Unit) (not shown). In this case, it is assumed that the engine ECU detects the operation state of engine 1 based on the engine speed and the intake air amount, for example, to carry out the process of changing passage length L of variable intake passage 16.

The control of passage length L of variable intake passage 16 may be carried out, e.g., in the following manner. A target passage length is calculated in accordance with the operation state of engine 1, and actuator 17 is used to control rotation of inner tube 30. A deviation of the actual passage length calculated based on the rotational phase of inner tube 30 from the target passage length is obtained, and feedback control is carried out according to whether the deviation falls within an allowable range or not.

Although not shown in the figure, the engine speed may be detected using an engine speed sensor such as a crank angle sensor, a cam angle sensor or the like. Further, although not shown, the intake air amount may be detected using an air flow meter that is attached to the intake pipe, an intake pressure sensor that detects the pressure inside the intake system (intake pressure), or a throttle sensor that detects the degree of opening of the throttle valve (throttle opening degree). Still further, although not shown, the rotational phase of inner tube 30 may be detected using a rotational phase sensor that detects a rotational phase (angle) of inner tube 30 from a prescribed reference position. The rotational phase sensor may be attached to outer tube 20.

As described above, according to the present embodiment, it is possible to properly adjust passage length L of variable intake passage 16 as well as the cross section of the air introducing portion (disconnected portion 32) over all the operation regions from the low engine speed region to the high engine speed region of engine 1, to thereby make the periodic pattern of the pulsation of the air correspond to the opening/closing timings of intake valve 9. This can improve the intake volumetric efficiency over the whole operation region, thereby contributing to an increase in output of engine 1.

A modification of the first embodiment of the present invention will now be described.

Figure 6:
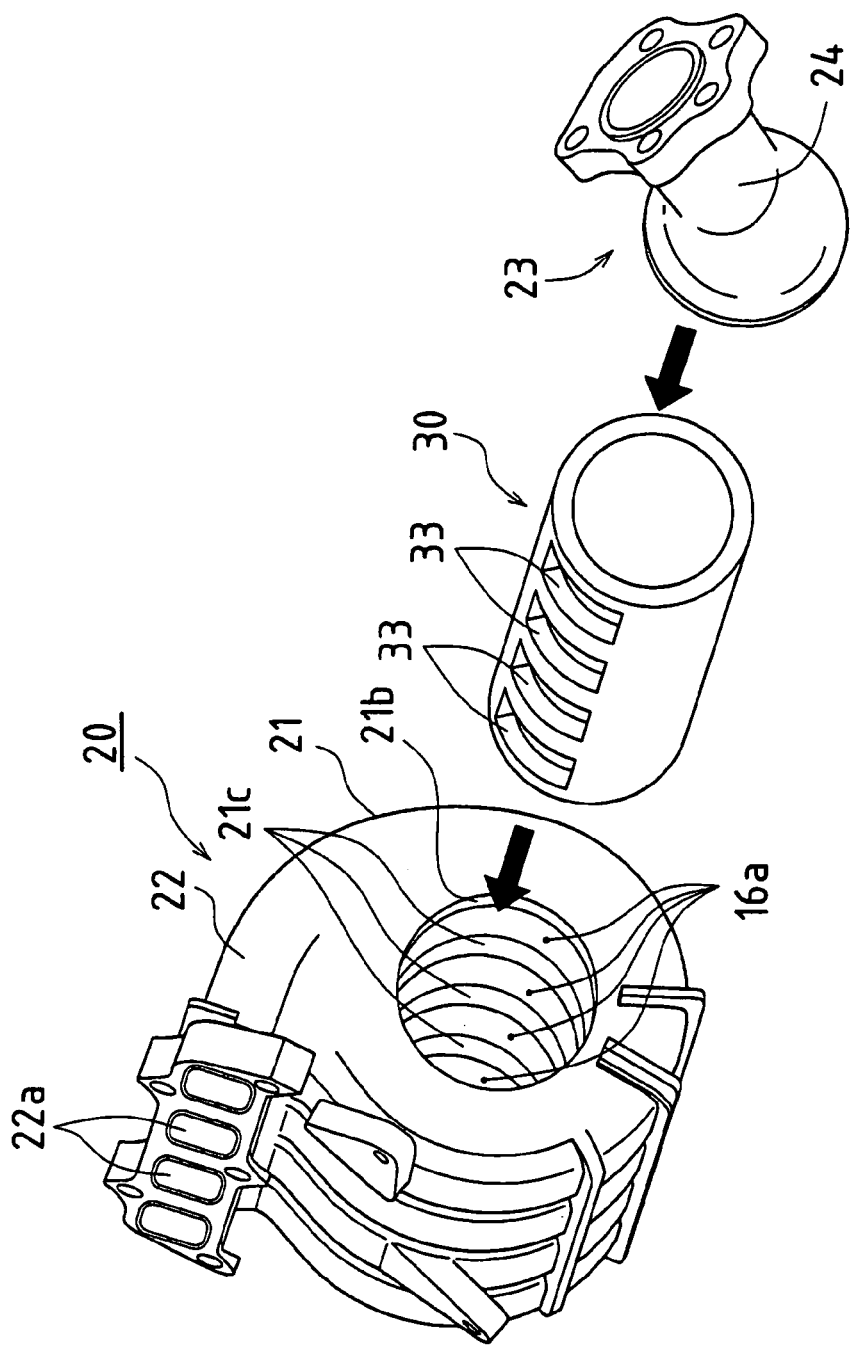
FIG. 6 shows a modification of the first embodiment.
Figure 7:
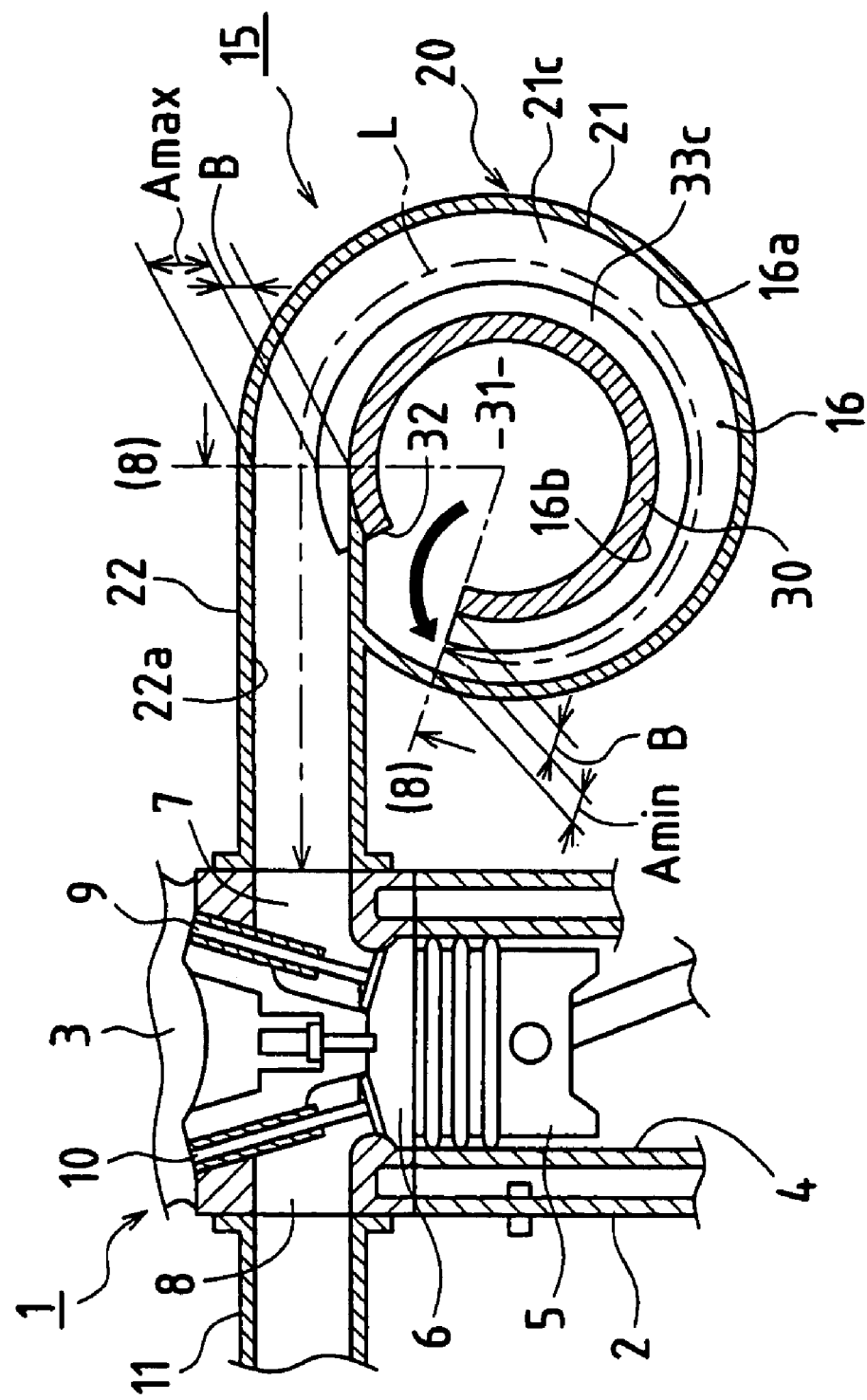
FIG. 7 is a cross sectional view of an internal combustion engine provided with an intake apparatus according to a second embodiment of the present invention.
Figure 8:
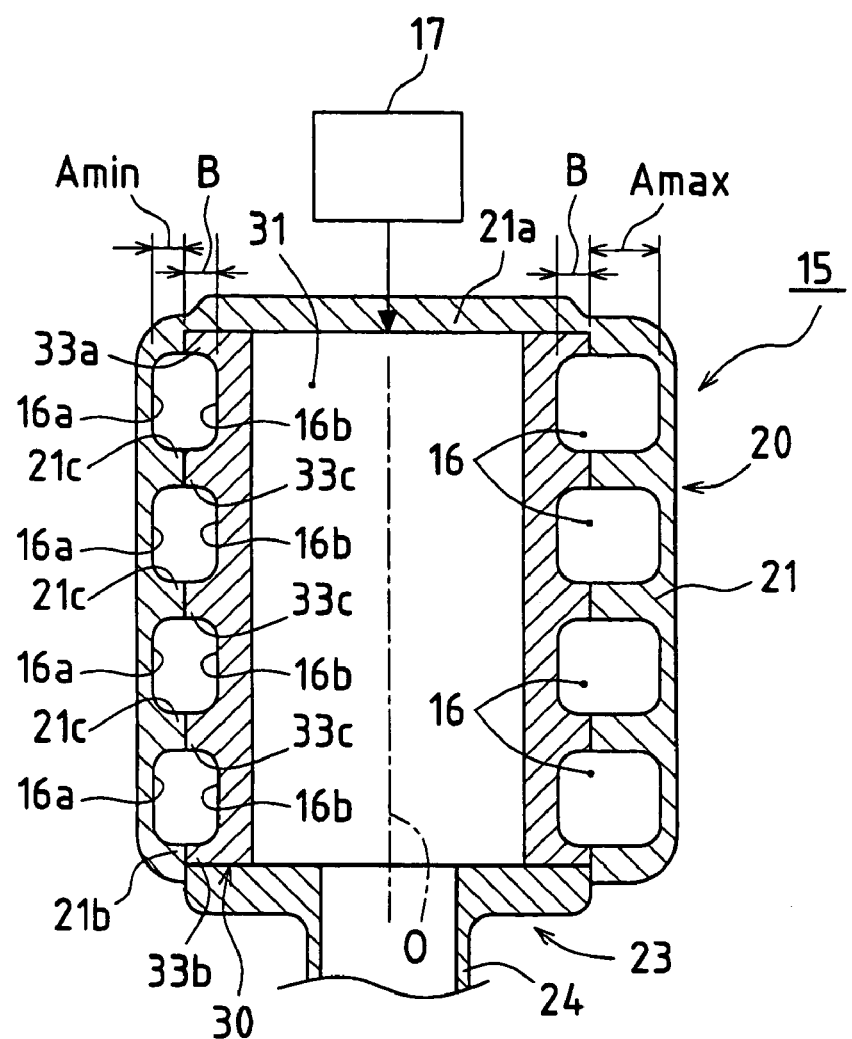
FIG. 8 shows a cross section along the line (8)-(8) in FIG. 7 as seen in the direction indicated by the arrow.

In the first embodiment, inner tube 30 may be formed into a cylindrical shape, as shown in FIG. 6. In this case, the cylinder may be provided with windows 33 penetrating therethrough in the radial direction only at a prescribed region on the circumference to form the air introducing portion. The number of windows 33 is made to correspond to the number of intake ports 7.

Second Embodiment

FIGS. 7-10 show a second embodiment of the present invention. In the present embodiment, inner tube 30 is provided with outer peripheral grooves 16b on its outer periphery that open outward in the radial direction.

Figure 9:
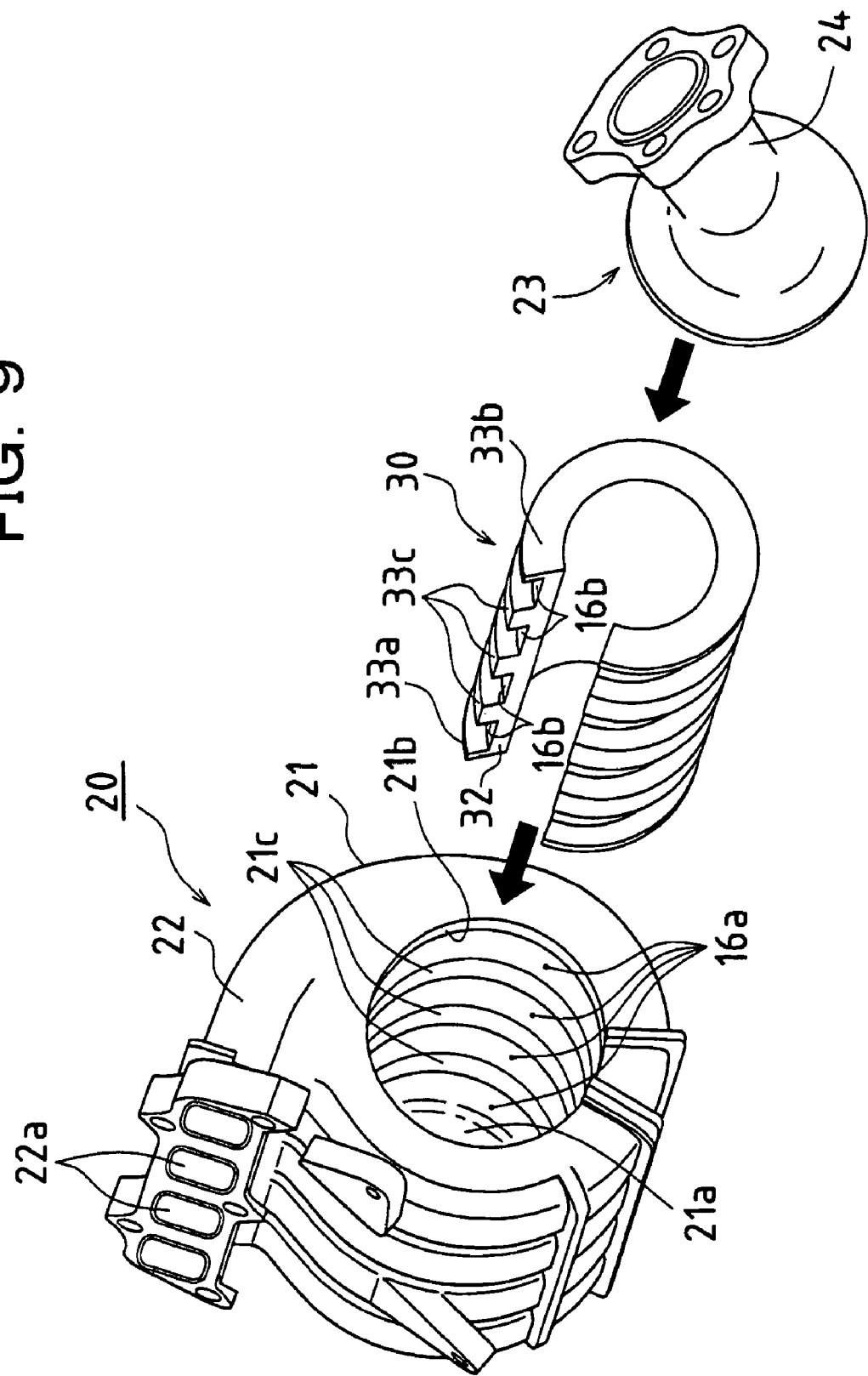
FIG. 9 shows the embodiment of FIG. 7 in a similar manner as in FIG. 4.
Figure 10:
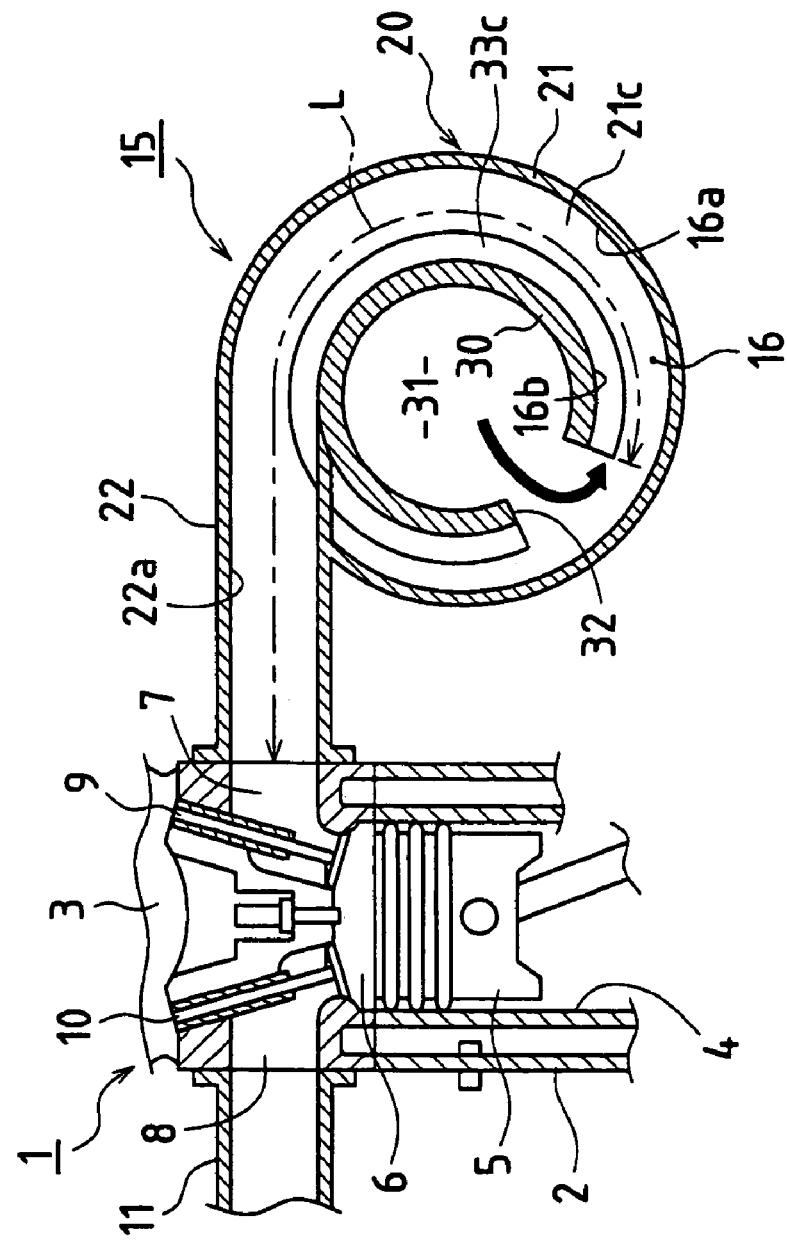
FIG. 10 shows the embodiment of FIG. 7 in a similar manner as in FIG. 5.

Specifically, as shown in FIG. 9, inner tube 30 has an approximately C-shape as seen from the side face, and on its outer peripheral surface, outer collars 33a and 33b are provided at the respective ends. The collars extend outward in the radial direction. The region between outer collars 33a and 33b is provided with three partition walls 33c extending outward in the radial direction. Two outer collars 33a, 33b and three partition walls 33c constitute four outer peripheral grooves 16b. Outer peripheral groove 16b of inner tube 30 and inner peripheral groove 16a of outer tube 20 together form a tubular space, which constitutes variable intake passage 16.

Disconnected portion 32 of inner tube 30 serves as the air introducing portion through which the air in surge tank 31 is introduced into variable intake passage 16.

In the present embodiment, inner peripheral groove 16a provided at outer tube main body portion 21 of outer tube 20 has a groove depth that gradually increases from the upstream side (Amin) toward the downstream side (Amax) in the air introducing direction, while outer peripheral groove 16b of inner tube 30 has a uniform groove depth B. As such, the cross section of variable intake passage 16 gradually increases from the upstream side to the downstream side in the air introducing direction.

Third Embodiment

Figure 11:
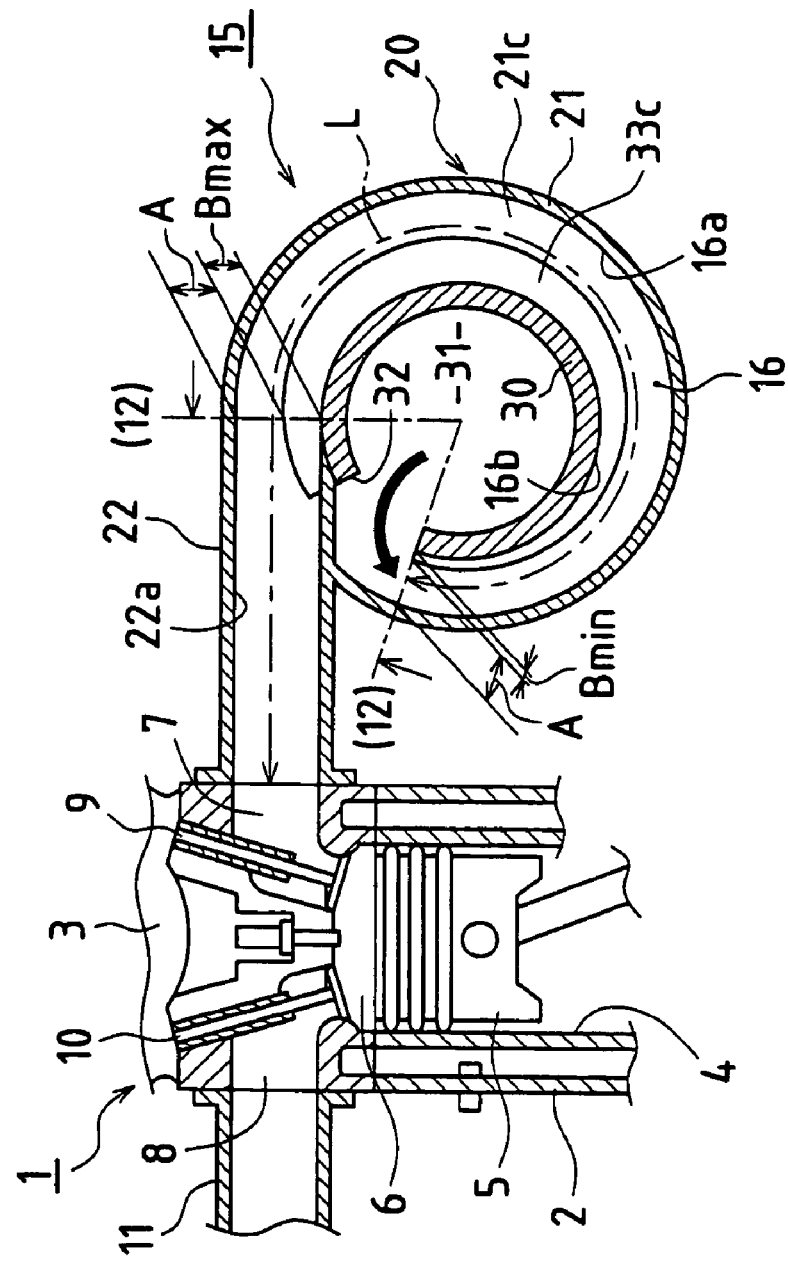
FIG. 11 is a cross sectional view of an internal combustion engine provided with an intake apparatus according to a third embodiment of the present invention.
Figure 12:
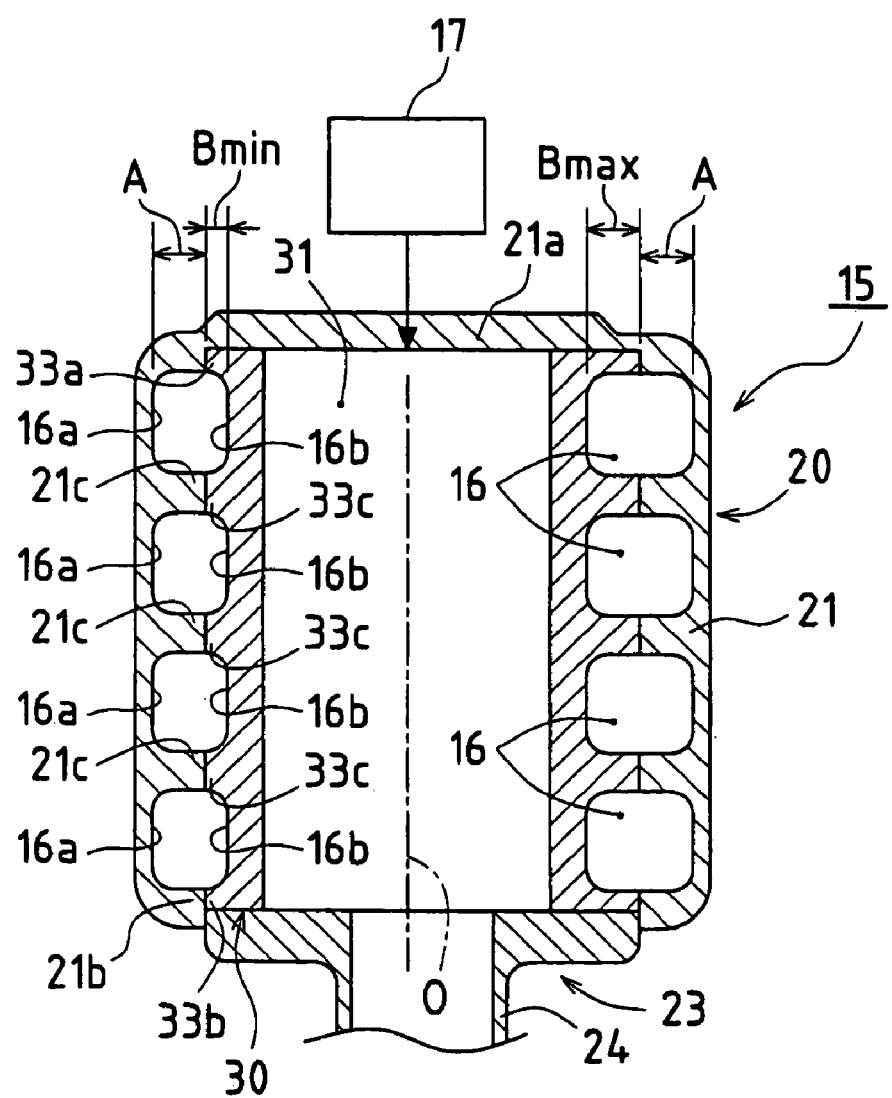
FIG. 12 shows a cross section along the line (12)-(12) in FIG. 11 as seen in the direction indicated by the arrow.
Figure 13:
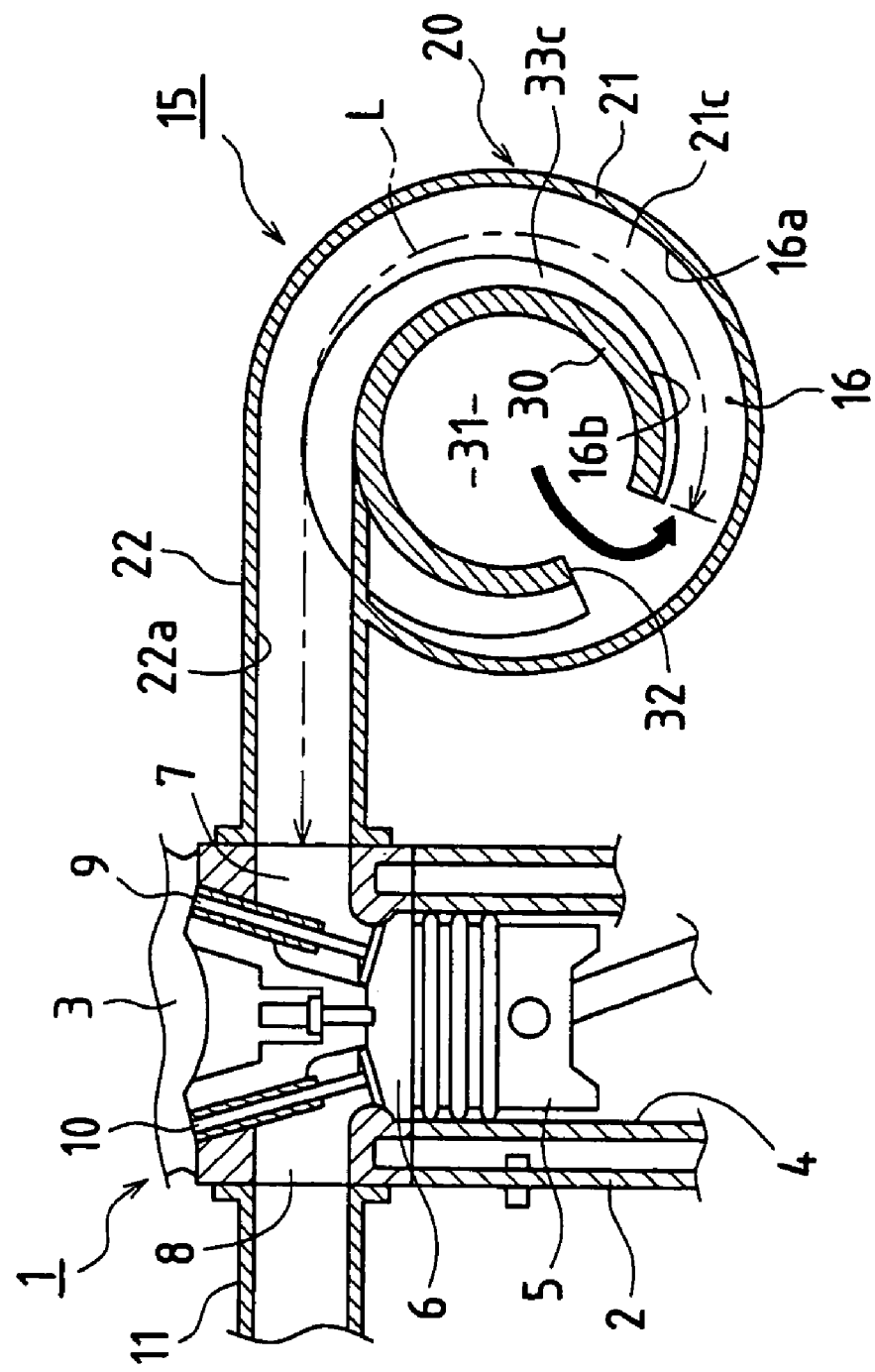
FIG. 13 shows the embodiment of FIG. 11 in a similar manner as in FIG. 5.

FIGS. 11-13 show a third embodiment of the present invention. In the present embodiment, opposite to the case of the second embodiment described above, it is configured such that outer peripheral groove 16b of inner tube 30 has a groove depth that gradually increases from the upstream side (Bmin) toward the downstream side (Bmax) in the air introducing direction, while inner peripheral groove 16a of outer tube 20 has a uniform groove depth A. In this case as well, the cross section of variable intake passage 16 gradually increases from the upstream side to the downstream side in the air introducing direction.

In any of the embodiments described above, intake apparatus 15 may be formed with variable intake passages 16 that are made of separate tubes independent from each other, although not shown. The number of the tubes corresponds to the number of cylinders of engine 1, and the tubes are connected together to form intake apparatus 15. For example, to form the tube constituting variable intake passage 16, an outer tube part having an inner peripheral groove and an inner tube part having an outer peripheral groove may be combined together. Each inner tube part may be supported in a rotatable manner inside the corresponding outer tube part. In this manner, a structure having a variable passage length is obtained. It is noted that a linearly projecting portion 22 is integrally provided at an end of each of the outer tube parts.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An intake apparatus of an internal combustion engine for supplying an air to a combustion chamber of the internal combustion engine, comprising:

a variable intake passage having a passage length from an air introducing portion to said combustion chamber configured to be changeable, the variable intake passage being made of a tubular space that is formed with a fixed member and a movable member arranged to face the fixed member and having a relative position with said fixed member changed, the movable member being moved to make a position of said air introducing portion farther from or closer to said combustion chamber to increase or decrease the passage length, wherein said variable intake passage has a cross section that gradually increases from an upstream side to a downstream side in an air introducing direction, wherein said fixed member is an outer tube and said movable member is an inner tube that is supported by the outer tube constituting said fixed member in a coaxial and relatively rotatable manner, and wherein the inner tube constituting said movable member is rotated in a normal or opposite direction about its central axis to continuously change the passage length of said variable intake passage, and wherein the outer tube constituting said fixed member has an inner peripheral groove, and the inner tube constituting said movable member has an outer peripheral groove that faces the inner peripheral groove of said fixed member to form a tubular space, and wherein at least one of the inner peripheral groove of said fixed member and the outer peripheral groove of said movable member has a groove depth that gradually increases from the upstream side to the downstream side in the air introducing direction of said variable intake passage.

2. The intake apparatus of an internal combustion engine according to claim 1, further comprising a driving mechanism for driving and rotating the inner tube constituting said movable member, wherein the driving mechanism is controlled to rotate said movable member in a direction increasing a distance of the air introducing portion from said combustion chamber to thereby increase the passage length and decrease the cross section of the air introducing portion when the internal combustion engine is in a low engine speed region, and the driving mechanism is controlled to rotate said movable member in a direction decreasing the distance of the air introducing portion from said combustion chamber to thereby decrease the passage length and increase the cross section of the air introducing portion as the internal combustion engine approaches a high engine speed region.

* * * * *